United States Patent Office 3,780,123
Patented Dec. 18, 1973

3,780,123
DISPROPORTIONATION OF ALKYLBENZENES
Robert M. Suggitt, Wappingers Falls, N.Y., assignor to Texaco Inc., New York, N.Y.
No Drawing. Filed May 15, 1972, Ser. No. 253,637
Int. Cl. C07c 3/62
U.S. Cl. 260—672 T
19 Claims

ABSTRACT OF THE DISCLOSURE

Alkylbenzenes are disproportionated in the presence of a composite catalyst composed of a hydrogen mordenite, alumina and a sulfided Group VIII metal.

BACKGROUND OF THE INVENTION

This invention relates to the catalytic conversion of alkylbenzenes. In a particularly desirable embodiment this invention is directed to the selective catalytic disproportionation of alkylbenzenes such as ethylbenzene, cumene and n-propylbenzene to benzene and dialkylbenzenes.

The catalytic disproportionation of alkylbenzenes has heretofore been considered employing a variety of catalysts. Catalysts proposed by the art include hydrogen mordenites containing a sulfided Group VIII metal and particularly decationized or hydrogen mordenites having high silica to alumina ratios as disclosed in U.S. Pat. 3,476,821, assigned to Texaco Inc. The process and catalytic compositions disclosed in this reference provides numerous advantages including the ability to selectively convert toluene, xylenes and trimethylbenzenes in accordance with thermodynamically controlled distributions with virtually no naphthene formation. However, while the previously known catalysts and processes provided some degree of disproportionation of non-methyl alkylbenzenes to dialkylbenzenes, the amount of conversion was limited or undesirable amounts of trialkylbenzenes were formed.

SUMMARY OF THE INVENTION

Broadly, this invention contemplates a process for the catalytic disproportionation of non-methyl alkylbenzenes which comprises contacting said alkylbenzene with a sulfide compound under disproportionation conditions with a composite catalyst comprising hydrogen mordenite having a silica to alumina mole ratio of greater than about 10 to 1, alumina, and a sulfided Group VIII metal. The catalyst employed in the instant process is prepared by impregnating a hydrogen mordenite having a silica to alumina mole ratio of greater than about 10 to 1 with a Group VIII metal, admixing the impregnated mordenite with hydrated alumina, calcining the mixture at temperatures up to 1100° F. and sulfiding the Group VIII metal. It has been found that the disproportionation of non-methyl alkylbenzenes in the presence of the aforementioned catalyst is significantly improved and that the catalytic composition employed in the process possesses superior mechanical strength contributing to long on stream time and extended catalyst life under conversion conditions.

The hydrocarbons disproportionated by the instant process include non-methyl alkylbenzenes corresponding to the formula:

where R is an alkyl group of from two to sixteen, preferably two to four, carbon atoms. Specific examples of the alkylbenzenes disproportionated herein include ethylbenzene, cumene, n-propylbenzene, tert-butylbenzene, n-hexylbenzene, 2-n-hexylbenzene, isooctylbenzene, n-decylbenzene, n-dodecylbenzene, 3-n-dodecylbenzene and n-hexadecylbenzene. Mixtures of alkylbenzenes can also be disproportionated, the preferred mixtures being those having a like number of carbon atoms in the alkyl group. Individually preferred alkylbenzenes are ethylbenzene, cumene and tert-butylbenzene. With regard to the conversion of the hydrocarbon, the feedstock containing one or more alkylbenzenes is contacted with the aforementioned catalyst at a temperature effective to disproportionate at least some of the hydrocarbons to aromatic products having a greater number and a lesser number of carbon atoms.

In accordance with the invention, the composite catalyst employed to disproportionate the aforementioned hydrocarbons is prepared by initially providing a hydrogen mordenite having a silica to alumina mole ratio above about 10:1 but less than about 100:1, particularly between about 12:1 and 80:1. In a highly preferred embodiment the hydrogen mordenite possesses a silica to alumina mole ratio of about 25:1 to 50:1. Hydrogen mordenites contemplated above as a component of the composite catalyst can be prepared from natural or commercially available synthetic sodium mordenites or commercially available hydrogen mordenites having silica to alumina ratios of about 10:1.

The sodium form of mordenite is not effective as a component of the disproportionation catalyst employed herein. However, it may be converted to hydrogen mordenite by ion exchange of the sodium in the mordenite with ammonium ions followed by heating or calcining to drive off ammonia. Alternatively, decationized or hydrogen mordenite can be provided by acid treatment of the sodium form. The hydrogen mordenite (10:1 $SiO_2/Al_2O_3$) whether prepared as above or available from commercial sources is thereafter subjected to severe acid leaching so as to substantially increase the silica to alumina mole ratio of the hydrogen mordenite to above about 10:1. However, the acid leaching operation must not destroy the mordenite's crystalline structure. Moreover, little improvement is realized in this process where the silica to alumina ratio of the mordenite is greater than about 100:1. Consequently, as a practical limit the acid leaching should be severe enough to produce a mordenite having a silica to alumina ratio between about 12:1 and 80:1, preferably from about 25:1 to 50:1. To acid leach the hydrogen mordenite we employ a mineral acid, for example hydrochloric or sulfuric acid, so as to selectively remove aluminum without destroying the crystalline structure of the mordenite. Acid strengths of 1 to 8 N are appropriate and the leaching temperature can range from room temperature up to the boiling point of the acid solution. Acid leaching is best accomplished when the mordenite is in the powdered form and not when pelleted. Following the leaching operation, the mordenite is water washed free of acid anions and is in the form of small soft aggregates of a particle size generally in the range of about 0.5 to 10 microns.

The acid leached hydrogen mordenite is now in a suitable form for impregnation with an aqueous solution of a Group VIII metal salt. Group VI–B metals may also be associated with the mordenite and the Group VIII impregnating solution may additionally contain soluble salts of members of Group VI–B or separate and subsequent impregnation may be undertaken with the Group VI–B component. Group VIII metals including platinum, palladium, rhodium, ruthenium, nickel and cobalt are introduced in an amount sufficient to provide the final composite catalyst with a Group VIII metal content of from 0.2 to 10.0 weight percent. Preferably, there is employed nickel or cobalt in an amount of from 3.0 to 8.0 weight percent. Platinum, palladium, rhodium and ruthenium are preferably present in an amount of about 0.2 to 2.0 weight percent. The Group VI–B metal including tungsten, molybdenum and chromium can also be associated with the hydrogen mordenite in amount ranging from about 3.0 to 15.0 weight percent based on the composite catalyst. After employing impregnation techniques well known to the art, the impregnated high silica hydrogen mordenite is beneficially heated to a temperature of from 100 to 300° F. so as to partially dry the impregnated particulates.

The improvements in non-methyl alkylbenzene disproportionation are achieved by admixing the metal impregnated high silica hydrogen mordenite with hydrated alumina such that the ultimate composite catalyst contains alumina as a component thereof in amounts ranging from 10 to 50 weight percent and preferably from 15 to 30 weight percent. In practice, the metal impregnated mordenite is introduced into a freshly prepared precipitate of hydrated alumina, such as alpha or beta alumina hydrate, and the components are mulled by passing through a colloid mill to give a uniform dispersion of the mordenite in the alumina. The mixing in the colloid mill causes the impregnated mordenite aggregates, some of which may be of a size of 20 to 50 microns, to be broken down into particles having average diameters of about 0.5 to 5 microns. It has been found that by impregnating the hydrogen mordenite powder, a more uniform distribution of the metal component can be secured than can be obtained by impregnation of a formed pellet. The composite resulting from the admixing operation is dried at temperatures of for example 130 to 150° F., although higher or lower temperatures may also be employed. The composite is subsequently crushed and sieved, for example through a —40 mesh. Sufficient water is added to give a good extrusion mix and the composite is formed into the desired shape contemplated for ultimate use. Illustratively, the particles can be ground to provide a finely divided catalytic mass as by mulling or beads may be formed but preferably the composite is extruded.

Subsequent to shaping, the composite is dried and calcined at a temperature up to 1100° F. Drying of the composite may be undertaken at ambient temperature or at temperatures of about 300° F. for several hours. Alternatively, ambient temperature can be initially employed with subsequent incremental increases in temperature to about 300° F. Thereafter the composite is calcined at temperatures of from about 500 to 1100° F., preferably in a stream of dry gas, and preferably at maximum temperatures of from 850 to 1000° F. Calcining of the composite converts the hydrated alumina to gamma or eta alumina depending upon whether the initial hydrate was alpha or beta. At the completion of the calcination step, the converted alumina is transformed into a strong binder. Pellets prepared by this technique possess crush strengths of from 10 to 40 pounds whereas catalysts excluding alumina are weak and have crush strengths of only a few pounds.

The Group VIII metal component of the calcined composite is thereafter converted to the sulfide and maintained in that condition during use. The metal component may be sulfided by contacting with for example hydrogen sulfide at a temperature of from 400 to 800° F. contained in a carrier gas such as hydrogen. In another technique the catalyst can be heated to operating temperature and then contacted with the liquid feed enriched with a sulfur containing compound such as for example carbon disulfide or methyl disulfide.

Inasmuch as the sulfided catalyst metal may be reduced during use, particularly when alkylbenzene disproportionation is conducted in the presence of hydrogen, the introduction of minor amounts of sulfur compounds into the reaction vessel will maintain the catalyst in a sulfided condition. This may be done by adding hydrogen sulfide to the hydrogen stream entering the reactor or by incorporating compounds such as carbon disulfide or methyl disulfide which decompose readily to hydrogen sulfide in the presence of hydrogen under the reactor conditions. These additions should be sufficient to maintain a mole ratio of hydrogen sulfide to hydrogen in the gas phase of from $3 \times 10^{-4}$ to $1 \times 10^{-2}$ over the catalyst. Typically, mole ratios of from $7 \times 10^{-4}$ to $5 \times 10^{-3}$ of hydrogen sulfide to hydrogen are used with the higher ratios of hydrogen sulfide to hydrogen generally being used at higher reaction temperatures. This low concentration of sulfide achieves the desired result without reacting to contaminate the products of disproportionation.

Although hydrogen has often been employed in prior art catalytic disproportionation processes, its use in this process is not critical. The use of hydrogen is recommended though since it will prolong the useful life of the catalyst. In general preferred operating conditions for non-methylbenzene disproportionation as practiced by this invention in the presence of the aforementioned catalyst includes space velocities in the range of about 0.1 to 15 liquid volumes per hour per volume of catalyst, preferably 0.5 to 8 LHSV; temperatures in the range of about 350 to 650° F., preferably 450 to 600° F. for ethylbenzene and cumene and 400 to 550° F. for $C_4$ and higher alkyl groups; pressures within the range of 100 to 2000 p.s.i.g., preferably in the range of 800 to 1200 p.s.i.g. and when hydrogen is used hydrogen concentrations of 100 to 15,000 s.c.f./bbl. of feed, preferably 5000 to 10,000 s.c.f./bbl. The reaction is suitably carried out over a fixed bed of catalyst with feedstock passing downwardly through the catalyst bed.

As the catalyst ages its activity slowly diminishes. The catalyst may be maintained at or periodically brought back to approximately its initial level of activity by increasing the operating temperature. Ultimately, regeneration of the catalyst by oxidation can be employed involving a controlled burning of the contaminants from the surface of the catalyst structure with air or a mixture of inert gases with air or oxygen.

The beneficial effects derived from the aforementioned invention are twofold. First the composite catalyst possesses significantly greater mechanical strength as compared to dealuminized mordenites containing a sulfided Group VIII metal thereon. The improved mechanical strength is attributed to the presence in the composite of eta or gamma alumina. Secondly, and totally unexpected, is the greater activity possessed by the composite catalyst containing the alumina. Such a result was unexpected inasmuch as alumina is virtually an inert material for disproportionating alkylbenzenes. Contrary to what would have been expected, namely that the catalytic activity of the Group VIII sulfided dealuminized mordenite would be diminished by dilution with alumina, it has been found that higher conversion results in the presence of the composite catalyst in terms of alkylbenzene converted.

Operating in accordance with the conditions and catalyst described above, it has been found that in disproportionating ethylbenzene, the meta-, para- and orthodiethylbenzenes are formed with no other material boiling near these ingredients. The relative amounts of the para-, meta-, and ortho-isomers are approximately those expected from thermodynamic equilibrium considerations and in the ratio obtained with other types of catalysts.

Small amounts of the triethylbenzenes are also formed during ethylbenzene disproportionation. However, unlike results employing zeolite Y catalysts where the ratios of 1,3,5- to 1,2,4-triethylbenzene corresponds to the thermodynamic ratio of 2:1, the ratio of 1,3,5- to 1,2,4-triethylbenzene is found to be well below two for the instant high $SiO_2/Al_2O_3$ mole ratio acid mordenite composite catalyst.

In disproportionating cumene, the diisopropylbenzenes and benzene are the predominant products with little triisopropylbenzene formed. The diisopropylbenzenes are formed in a ratio similar to that found with other catalysts. However, the ratio of 1,3,5- to 1,2,4-triisopropylbenzenes formed with the high $SiO_2/Al_2O_3$ mole ratio acid mordenite composite catalyst is well below the value expected for trialkylpropylbenzenes.

Similarly, the total amounts of trialkylbenzenes (1,3,5- and 1,2,4-trialkylbenzenes) are less than obtained with other catalysts for the same degree of non-methyl alkylbenzene disproportionation. The disproportionation is primarily limited to benzene and dialkylbenzene formation and secondary disproportionation of the dialkylbenzenes is suppressed. These results suggest that the subject composite is acting as a shape selective catalyst.

The disproportionated aromatic hydrocarbons provided and recovered from the instant process have utility in a plurality of applications. For example, the diethylbenzenes may be separated by chromatographic adsorptive processes and thereafter dehydrogenated to divinylbenzene, a polymer precursor. Likewise, paradiisopropylbenzene may be dehydrogenated to para-diisopropenylbenzene, a polymer precursor. The ortho-, meta-, and para-diisopropylbenzenes are also valuable in preparing catechol, resorcinol and hydroquinone respectively. These dihydroxybenzenes may be formed by oxidizing the diisopropylbenzene to the dihydroperoxide and cleavage to the dihydroxybenzene and acetone.

In order to more fully illustrate the nature of this invention and manner of practicing the same the following examples are presented.

EXAMPLE I 2000 grams of a commercially available sodium mordenite powder having an average particle size of about 10 to 30 microns and comprising 6.86 weight percent $Na_2O$, 10.2 weight percent $Al_2O_3$, 68.2 weight percent $SiO_2$ and a $SiO_2/Al_2O_3$ mole ratio of 11.4/1 was acid leached with 4 liters of 6 N HCl for 24 hours at a temperature of 130 to 140° F. The acid was decanted and the solids washed three times with 4 liters of hot water and three times with 4 liters of cold water which provided a product comprising 0.95 weight percent $Na_2O$, 6.9 weight percent $Al_2O_3$, 86.1 weight percent $SiO_2$ and a $SiO_2/Al_2O_3$ mole ratio of 21.2/1. The acid leaching was again repeated, the product was washed free of chloride ion, dried at 300° F. and calcined to a temperature of 1000° F. in a stream of dry air. The final acid leached mordenite consisted of 0.09 weight percent $Na_2O$, 3.74 weight percent $Al_2O_3$, 88.2 weight percent $SiO_2$ and a $SiO_2/Al_2O_3$ mole ratio of 40/1.

410 grams of the acid leached mordenite was impregnated with 250 cc. of a cobalt nitrate solution containing 125 grams of $Co(NO_3)_2 \cdot 6H_2O$ and the impregnated powder was dried for 16 hours at a temperature of 130 to 140° F.

368 grams of $Al_2(SO_4)_3 \cdot 18H_2O$ were dissolved in 3 liters of distilled water and 300 cc. of concentrated ammonium hydroxide were added to effect precipitation of aluminum hydroxide. The precipitate was recovered by filtration and washed 3 times with distilled water. The cobalt impregnated acid leached mordenite was mixed with the wet hydrated alumina precipitate and passed through a mill to effect homogeneous mixing. After partially drying the mixture at a temperature of 130 to 140° F. for 16 hours and extruding into ⅟₁₆ inch pellets, the pellets were dried at room temperature for 16 hours, at 130 to 140° F. for 8 hours, at 300° F. for 16 hours and finally calcined at 1000° F. for 2 hours in dry air. The calcined catalyst pellets were sulfided at 700° F. for 4 hours with hydrogen sulfide. The recovered sulfided catalyst consisted of 4.4 weight percent cobalt, 15 weight percent gamma alumina and the remainder hydrogen mordenite having a $SiO_2/Al_2O_3$ mole ratio of 40/1. The composite catalyst had an average crush strength of 20 pounds as determined by using a Chatillon Crush Strength Tester.

EXAMPLE II 2000 grams of commercially available sodium mordenite powder comprising 6.86 weight percent $Na_2O$, 10.2 weight percent $Al_2O_3$, 68.2 weight percent $SiO_2$ and a $SiO_2/Al_2O_3$ mole ratio of 11.4/1 was acid leached with 4 liters of 6 N HCl for 24 hours at a temperature of 130 to 140° F. The acid was decanted and the solids washed three times with 4 liters of hot water and three times with 4 liters of cold water. The acid leaching was repeated three more times and the product was washed free of chloride ion, dried at 300° F. and calcined at a temperature of 1000° F. in dry air. The final acid leached mordenite consisted of 0.02 weight percent $Na_2O$, 2.54 weight percent $Al_2O_3$, 90.6 weight percent $SiO_2$ and had a $$SiO_2/Al_2O_3$$

mole ratio of 60/1.

400 grams of the above described acid leached mordenite was impregnated with 200 cc. of a nickel nitrate solution containing 107 grams of $Ni(NO_3)_2 \cdot 6H_2O$ and the impregnated powder was dried for 16 hours at a temperature of 130 to 140° F.

817 grams of $Al_2(SO_4)_3 \cdot 18H_2O$ were dissolved in 3 liters of distilled water and 400 cc. of concentrated ammonium hydroxide were added to effect precipitation of the alumina hydroxide. The precipitate was recovered by filtration and washed three times with distilled water. Half of the resulting alumina gel was used in further preparing the catalyst.

720 grams of the nickel impregnated acid leached mordenite were mixed with 1455 grams of wet hydrated alumina gel and passed through a mill to effect homogeneous mixing. After partially drying the mixture at 130 to 140° F. for 16 hours, the mixture was ground and sieved to —40 mesh. Sufficient water was added to ensure a good extrusion mix and the material was then extruded into ⅟₁₆ inch pellets. The pellets were dried at ambient temperature for 16 hours, at 130 to 140° F. for 8 hours and at 300° F. for 16 hours. Thereafter, the pellets were calcined in dry air starting at 500° F. and the temperature raised in increments of 100° F. per hour until a final temperature of 1000° F. was reached whereupon the catalyst was calcined at 1000° F. for two hours in dry air.

The calcined catalyst was sulfided at 700° F. for 4 hours with $H_2S$ and subsequently cooled in a stream of dry nitrogen. The sulfided catalyst consisted of 4.6 weight percent nickel, 5.5 weight percent sulfur, 15 weight percent gamma alumina and the remainder hydrogen mordenite having a $SiO_2/Al_2O_3$ mole ratio of 60/1. The material had an average crush strength of 14 pounds as determined employing a Chatillon Crush Strength Tester.

EXAMPLE III 460 grams of commercially available hydrogen mordenite powder comprising 8.9 weight percent $Al_2O_3$, 81.1 weight percent $SiO_2$ and a $SiO_2/Al_2O_3$ mole ratio of 16/1 was impregnated with 250 cc. of a solution containing 125 grams of $Co(NO_3)_2 \cdot 6H_2O$. The material was dried at 130 to 140° F. for 16 hours.

368 grams of $Al_2(SO_4)_3 \cdot 18H_2O$ were dissolved in 3 liters of distilled water and 300 cc. of concentrated ammonium hydroxide were added to effect precipitation of aluminum hydroxide. The precipitate was recovered by filtration and washed three times with distilled water.

The cobalt impregnated hydrogen mordenite, 669 grams, was mixed with 971 grams of the wet hydrated alumina gel and passed through a colloid mill to effect homogeneous mixing. After partially drying the mixture at 130 to 140° F. for 16 hours, the mixture was ground and sieved to −40 mesh. Sufficient water was added to ensure a good extrusion mix and the material was then extruded into 1/16 inch pellets. The pellets were dried and calcined in the same manner as in Example II. The catalyst consisted of 4.7 weight percent cobalt, 15 weight percent gamma alumina, the remainder hydrogen mordenite having a SiO₂/Al₂O₃ mole ratio of 16/1 and had an average crush strength of 40 pounds. The catalyst was sulfided in the manner described in Example II and had the following calculated composition: 5.0 weight percent cobalt, 2.7 weight percent sulfur, 15.0 weight percent gamma alumina the remainder hydrogen mordenite, and had a crush strength similar to the unsulfided material.

EXAMPLE IV 2000 grams of commercially available sodium mordenite 1/16 inch pellets comprising 7.2 weight percent Na₂O, 12.5 weight percent Al₂O₃ and a SiO₂/Al₂O₂ mole ratio of 10/1 was acid leached with four liters of 6 N HCl for 24 hours at a temperature of 130 to 140° F. The acid was decanted and the solids washed three times with six liters of hot water and three times with six liters of cold water. The acid leaching was repeated three more times and the product was washed free of chloride ion, dried at 300° F. and calcined at a temperature of 1000° F. in dry air. The final acid leached mordenite consisted of 0.07 weight percent Na₂O, 2.3 weight percent Al₂O₃, 88.3 weight percent SiO₂ and had a SiO₂/Al₂O₃ mole ratio of 65/1. 423 grams of the acid leached mordenite pellets were thereafter impregnated with 200 cc. of a cobalt nitrate solution containing 105 grams of Co(NO₃)₂·6H₂O. After drying on steam plate for 2 hours and at 300° F. for 16 hours, the pellets were calcined in dry air starting at 500° F. for 1 hour and the temperature raised in increments of 100° F. per hour until a final temperature of 1000° F. was reached whereupon the pellets were calcined at 1000° F. for 2 hours in dry air.

The calcined pellets were sulfided at 700° F. for 4 hours with H₂S and the final catalyst consisted of 5.5 weight percent cobalt, 3.4 weight percent sulfur and the remainder hydrogen mordenite having a SiO₂/Al₂O₃ mole ratio of 65/1. The catalyst had an average crush strength of 4.0 pounds.

EXAMPLE V 340 grams of alumina 1/16 inch pellets were impregnated with 200 cc. of a cobalt nitrate solution containing 90 grams of Co(NO₃)₂·6H₂O. The pellets were dried, calcined and sulfided as in Example IV. The final material had a calculated composition of 4.7 weight percent cobalt, 2.5 weight percent sulfur, and the remainder alumina and had an average crush strength of 12.7 pounds. Such a composite is essentially inactive in disproportionating alkylaromatic hydrocarbons of the type considered in this application.

EXAMPLE VI

A catalyst composed of 3.5 weight percent cobalt, 9.5 weight percent sulfur, 15.0 weight percent alumina and the remainder hydrogen mordenite having a SiO₂/Al₂O₃ mole ratio of 34/1 in the form of 1/16 inch pellets was employed to disproportionate ethylbenzene and cumene. The conditions and results are set out in Table I. In each of the runs, 71 grams of catalyst were employed. In addition runs A and B consisted of an ethylbenzene feedstock containing 2.3 milliliters of methyl disulfide per liter of ethylbenzene. Runs C and D consisted of a cumene feedstock containing 2.4 milliliters of methyl disulfide per liter of cumene.

TABLE I

| Run | A | B | C | D |
|---|---|---|---|---|
| Temperature, ° F. | 525 | 573 | 525 | 570 |
| Pressure, p.s.i.g. | 800 | 800 | 800 | 800 |
| LHSV | 2.6 | 2 | 2 | 2 |
| H₂/hydrocarbon mole ratio | 3.1 | 3.2 | 3.6 | 3.5 |
| Product analysis, wt. percent: | | | | |
| Non-aromatics | 0.6 | 2.0 | 0.7 | 1.9 |
| Benzene | 18.0 | 20.0 | 17.0 | 21.3 |
| Toluene | 0.2 | 0.8 | 0.1 | 0.1 |
| Ethylbenzene | 49.9 | 48.1 | 0.4 | 0.5 |
| Cumene | | | 42.6 | 39.9 |
| m- and p-Ethyltoluene | 0.3 | 0.8 | | |
| o-Ethyltoluene | Trace | 0.1 | | |
| m-Diethylbenzene | 18.3 | 15.8 | | |
| p-Diethylbenzene | 8.4 | 7.2 | | |
| o-Diethylbenzene | 2.0 | 1.7 | | |
| 1,3,5-triethylbenzene | 0.8 | 1.7 | | |
| 1,2,4-triethylbenzene | 1.3 | 1.1 | | |
| n-Propylbenzene | | | 4.5 | 7.2 |
| m-Diisopropylbenzene | | | 17.0 | 11.8 |
| o-Diisopropylbenzene | | | 0.2 | 0.2 |
| p-Diisopropylbenzene | | | 12.2 | 10.2 |
| 1,2,4-triisopropylbenzene | | | 0.9 | 1.6 |
| 1,3,5-triisopropylbenzene | | | 0.1 | 0.2 |
| Unidentified | 0.1 | 0.4 | 4.4 | 5.2 |

As seen in Table I, half of the ethylbenzene feed is disproportionated to benzene and diethylbenzenes with very little triethylbenzene or other by-product formation. The total amount of triethylbenzenes is less than one-third of the amount that might be expected basis the degree of primary disproportionation of the ethylbenzene. In addition, the amount of 1,3,5-triethylbenzene is less than the amount of 1,2,4-triethylbenzene formed even though thermodynamic considerations predict the amount of the 1,3,5-isomer should be double the amount of the 1,2,4-triethylbenzene formed. The diethylbenzenes formed are in the ratio expected from thermodynamic considerations.

A similar result is obtained with cumene disproportionation. The triisopropylbenzene formation is suppressed relative to what would be expected basis the degree of cumene disproportionation. Likewise, the 1,3,5-triisopropylbenzene formation is suppressed relative to the 1,2,4-triisopropylbenzene.

It is seen that the shape selective character of the acid leached mordenite composite catalyst is advantageous in the disproportionation of ethylbenzene or cumene. Their dialkylbenzene products are more desirable than the trialkylbenzenes and the composite catalyst suppresses the formation of the triethylbenzenes and triisopropylbenzenes.

Moreover, when a transition hydrogenation type metal is not present on the catalyst, the catalyst deactivates rapidly due to coke laydown. The addition of from 0.5 to 10.0 weight percent nickel or cobalt, preferably 3.0 to 8.0 weight percent, or from 0.2 to 2.0 weight percent platinum, palladium, rhodium or ruthenium reduces the deactivation rate of the catalyst. Catalysts containing approximately 5 weight percent cobalt present in the sulfided stock can operate for hundreds of hours with only a slight loss in conversion rate whereas a similar catalyst with no metal present is virtually inactive within 24 hours due to carbon laydown.

I claim:
1. A process for the catalytic disproportionation of non-methyl alkylbenzenes corresponding to the formula:

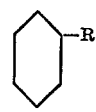

where R is an alkyl group of from two to sixteen carbon atoms which comprises contacting said alkylbenzene with a sulfide compound under disproportionation conditions with a composite catalyst comprising hydrogen mordenite having a silica to alumina mole ratio of between about 12:1 to 80:1, alumina and a sulfided Group VIII metal.

2. A process according to claim 1 wherein R is an alkyl group of from two to four carbon atoms.

3. A process according to claim 1 wherein said alkylbenzene is ethylbenzene.

4. A process according to claim 1 wherein said alkylbenzene is cumene.

5. A process according to claim 1 wherein said alkylbenzene is n-propylbenzene.

6. A process according to claim 1 wherein said alkylbenzene is tert-butylbenzene.

7. A process according to claim 1 wherein said alkylbenzene is a mixture of n-propylbenzene and isopropylbenzene.

8. A process according to claim 1 wherein said Group VIII metal comprises from 0.2 to 10.0 weight percent of said composite catalyst.

9. A process according to claim 1 wherein said Group VIII metal is nickel or cobalt and comprises from 3.0 to 8.0 weight percent of said composite catalyst.

10. A process according to claim 1 wherein said Group VIII metal is selected from the group consisting of platinum, palladium, rhodium and ruthenium and comprises from 0.2 to 2.0 weight percent of said composite catalyst.

11. A process according to claim 1 wherein said alumina is eta or gamma alumina and comprises from 10 to 50 weight percent of said composite catalyst.

12. A process according to claim 11 wherein said alumina comprises from 15 to 30 weight percent of said composite catalyst.

13. A process according to claim 1 wherein a sulfided Group VI-B metal is associated with said composite catalyst and comprises 3.0 to 15.0 weight percent thereof.

14. A process according to claim 1 wherein said silica to alumina mole ratio is from about 25:1 to 50:1.

15. A process according to claim 1 wherein said disproportionation conditions comprise a temperature in the range of 350 to 650° F., a space velocity in the range of 0.1 to 15 liquid volumes per volume of catalyst per hour and a pressure in the range of 100 to 2000 p.s.i.g.

16. A process according to claim 1 wherein said alkylbenzene is ethylbenzene or cumene and said disproportionation conditions comprise a temperature of from 450 to 600° F.

17. A process according to claim 1 wherein the value of R in said alkyl group is from 4 to 16 and wherein said disproportionation conditions comprise a temperature of from 400 to 550° F.

18. A process according to claim 1 wherein said process is conducted in the presence of hydrogen.

19. A process according to claim 13 wherein said Group VI-B metal is tungsten, molybdenum or chromium.

References Cited

UNITED STATES PATENTS

| | | | |
|---|---|---|---|
| 3,476,821 | 11/1969 | Brandenburg et al. | 260—672 T |
| 3,677,973 | 7/1972 | Mitsche et al. | 260—672 T |
| 3,409,685 | 11/1968 | Donaldson et al. | 260—668 A |
| 3,463,744 | 8/1969 | Mitsche | 260—672 T |
| 3,551,510 | 12/1970 | Pollitzer et al. | 260—672 T |
| 3,644,219 | 2/1972 | Mitsche | 252—455 Z |

CURTIS R. DAVIS, Primary Examiner

PO-1050
(5/69)

UNITED STATES PATENT OFFICE
CERTIFICATE OF CORRECTION

Patent No. 3,780,123      Dated December 18, 1973

Inventor(s) Robert M. Suggitt

It is certified that error appears in the above-identified patent and that said Letters Patent are hereby corrected as shown below:

Column 5, line 8      "trialkylpropylbenzenes" should read -- triisopropylbenzenes --

Column 7, line 22      After "$Al_2O_3$" insert -- ,75.0 weight percent $SiO_2$ --

Column 7, line 22      "$SiO_2/Al_2O_2$" should read -- $SiO_2/Al_2O_3$ --

Signed and sealed this 7th day of May 1974.

(SEAL)
Attest:

EDWARD M.FLETCHER,JR.
Attesting Officer

C. MARSHALL DANN
Commissioner of Patents